United States Patent
Kurtz et al.

(10) Patent No.: US 12,359,097 B2
(45) Date of Patent: Jul. 15, 2025

(54) LOW BOND-TEMPERATURE HOT MELT ADHESIVE WITH HIGH IMPACT STRENGTH AND CHEMICAL RESISTANCE

(71) Applicant: Sun Chemical Corporation, Parsippany, NJ (US)

(72) Inventors: Paul Kurtz, Bloomfield, NJ (US); Bo Sun, Carlstadt, NJ (US); Philippe Schottland, Carlstadt, NJ (US); Ewelina Szymczak, Carlstadt, NJ (US); Jerome Moyer, Carlstadt, NJ (US); Saeid Savarmand, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/874,935

(22) PCT Filed: Aug. 18, 2023

(86) PCT No.: PCT/US2023/030620
§ 371 (c)(1),
(2) Date: Dec. 13, 2024

(87) PCT Pub. No.: WO2024/039874
PCT Pub. Date: Feb. 22, 2024

(65) Prior Publication Data
US 2025/0163300 A1 May 22, 2025

Related U.S. Application Data

(60) Provisional application No. 63/399,022, filed on Aug. 18, 2022.

(51) Int. Cl.
*C09J 7/35* (2018.01)
*C09J 123/12* (2006.01)
*C09J 167/00* (2006.01)

(52) U.S. Cl.
CPC .............. *C09J 7/35* (2018.01); *C09J 123/12* (2013.01); *C09J 167/00* (2013.01); *C09J 2203/326* (2013.01); *C09J 2301/304* (2020.08); *C09J 2423/10* (2013.01); *C09J 2467/00* (2013.01); *C09J 2491/00* (2013.01)

(58) Field of Classification Search
None
See application file for complete search history.

(56) References Cited

U.S. PATENT DOCUMENTS

| | | | |
|---|---|---|---|
| 6,543,208 B1 | 4/2003 | Kobayashi | |
| 6,607,823 B2 | 8/2003 | Posey | |
| 6,794,443 B2 | 9/2004 | Chu | |
| 7,147,384 B2 | 12/2006 | Hardcastle | |
| 8,079,470 B2 | 12/2011 | Trajkovich | |
| 8,389,117 B2 | 3/2013 | Shelby | |
| 8,431,232 B2* | 4/2013 | Shelby | C09J 167/02 528/308 |
| 8,734,939 B2 | 5/2014 | Herr | |
| 8,830,662 B2 | 9/2014 | Myers | |
| 9,122,941 B2 | 9/2015 | Hoobler | |
| 9,469,791 B2 | 10/2016 | Knutson | |
| 10,300,658 B2 | 5/2019 | Dinh | |
| 10,550,224 B2 | 2/2020 | Liu | |
| 2007/0042193 A1 | 2/2007 | Wang | |
| 2007/0088116 A1 | 4/2007 | Abba | |
| 2015/0080511 A1 | 3/2015 | Knutson | |

FOREIGN PATENT DOCUMENTS

| | | |
|---|---|---|
| CN | 102576822 B | 8/2015 |
| EP | 2823011 B1 | 1/2017 |
| JP | H04110381 A | 4/1992 |
| JP | 5714942 B2 | 5/2015 |
| KR | 20160046612 A | 4/2016 |
| TW | I482000 B | 4/2015 |
| WO | WO1998/003603 A1 | 1/1998 |
| WO | WO2015/148685 A1 | 10/2015 |
| WO | WO2021/246482 A1 | 12/2021 |

OTHER PUBLICATIONS

International Search Report issued in International Application No. PCT/US2023/030620, mailed Nov. 2, 2023.
Written Opinion of the International Searching Authority issued in International Application No. PCT/US203/030620, mailed Nov. 2, 2023.
International Preliminary Report on Patentability (Chapter II of the Patent Cooperation Treaty) issued in International Application No. PCT/US2023/030620, mailed Oct. 1, 2024.
"Vitel 3550B-M Copolyester Laminating Resin Typical Physical Properties",Mar. 30, 2016 (Mar. 30, 2016), pp. 1-2, XP093094438.

* cited by examiner

*Primary Examiner* — Christopher M Rodd
(74) *Attorney, Agent, or Firm* — Marian E Fundytus; Amster Rothstein & Ebenstein LLP

(57) ABSTRACT

The present invention provides a hot melt adhesive, comprising polyester resins with a Tg below 0° C. and frequently combined with polyester resins with a Tg above 50° C. that can be applied at 80° C. or lower, having excellent impact resistance and broad chemical resistance. The hot melt adhesive of the invention is ideally suited for use in the manufacture of handheld and wearable electronic devices.

17 Claims, 11 Drawing Sheets

LOW BOND-TEMPERATURE HOT MELT ADHESIVE WITH HIGH IMPACT STRENGTH AND CHEMICAL RESISTANCE

CROSS REFERENCE TO RELATED APPLICATIONS

The present application is a § 371 National Phase application based on PCT/US2023/030620 filed Aug. 18, 2023, which claims the benefit of U.S. Provisional Application No. 63/399,022, filed Aug. 18, 2022, the subject matter of each of which is incorporated by reference in their entirety.

FIELD OF THE INVENTION

The present invention provides thermoplastic Hot Melt Adhesive (HMA) compositions for low temperature bonding, de-bonding, and re-bonding (self-repairing) of temperature sensitive devices, such as handheld and wearable electronic devices.

BACKGROUND OF THE INVENTION

Handheld and wearable electronic devices, such as cell phones, smart jewelry, listening devices and e-textiles, will be ubiquitous for the foreseeable future. These devices need to be rugged to withstand the variety of harsh conditions to which they are subjected. KR 20160046612A, U.S. Pat. Nos. 10,300,658 and 9,122,941B disclose case constructions of various electronic devices and process for their manufacture.

Handheld and wearable electronic devices, like many other electronic devices, have openings that can serve as potential pathways through which moisture may enter interior portions of the devices. The openings may be associated with gaps between adjacent housing structures, openings for buttons, openings for audio and connector ports or other openings in device structures. U.S. Pat. No. 8,830,662 discloses cases for electronic devices comprising moisture repelling coatings in the vicinity of such openings to help prevent moisture from reaching the interior of the device.

TWI482000B discloses an electronics casing designed to prevent the entry of water, comprising a two part sealing member comprising a first structure, containing a first material, which includes a groove with an opening towards the outside of the sealing member, and a second structure, containing a second material, disposed in the groove, wherein the water absorption rate of the second material is greater than the water absorption rate of the first material.

Various adhesives and sealants are used to prevent water entry in many articles. Often, sealants and adhesives are formulated to meet the requirements of a particular application, and are not necessarily suited for other applications. Many electronic devices and components require assembly at temperatures<80° C. to prevent degradation of diode arrays, sensors, conductive films, optical coatings, and solder bonds. Many current adhesives and sealants are not designed for such a low temperature of construction and are therefore not viable in these applications.

U.S. Pat. No. 6,543,208 discloses a bag for packaging food products comprising a multi-layered, laminated film comprising a polyester sealant layer with a low melting point, a barrier layer of vapor-deposited ceramic or metal, and a polyester heat resistant layer with a high melting point. Preferably the sealant layer has a melting point being below 160° C.

U.S. Pat. No. 8,079,470 discloses a multilayer thermolaminating film with a heat sealable layer for use in the construction of a reusable package. The multilayer film comprises a first layer of an amorphous polyester, such as amorphous polyethylene terephthalate, a second layer of a polyester, e.g., polyethylene terephthalate (PET), and an adhesive layer for attaching a cover.

WO 2015/148685 discloses a solvent-based, low temperature heat seal coating solution, with a heat seal temperature as low as 70° C., comprising an amorphous or semi-crystalline polyester or co-polyester resin, a tackifier, anti-blocking agent, and solvent.

U.S. Pat. No. 6,607,823 discloses a water dispersible copolyester coating which is applied to a polyester film to form a durable, strong, moisture resistant heat seal. The heat seal coating comprises a preferably water soluble propylene diol-based copolyester formed from isophthalic acid, the sodium salt of 5-sulfoisophthalic acid in approximately a 9:1 ratio, and 1,3-propane diol.

There is a growing preference in many areas for using easily de-constructable articles, e.g., mono-layer adhesives and sealants preferred over multi-layer laminates, or solvent free materials preferred over solutions or dispersions in an organic or aqueous media. Layered materials are not readily separated and are unlikely to be compostable or recyclable. The leftover scrap from layered adhesives cannot be reused. Solutions or dispersions can contain dangerous or unhealthy VOCs, and complicate processes with the need to remove water or other solvents. The sealants and adhesives above function in a multi-layer system or contain organic solvents or water.

Hot melt adhesives (HMAs) are solid to semi-solid at room temperature, and are applied without solvents. They are applied from the melt and build both adhesive and cohesive strength upon resolidification and crystallization of elements in the composition. HMAs are deposited by heating, in a melt tank or hot-glue gun, etc., typically from about 120° C. to about 240° C., and pumping the material into a dispenser, which then applies the HMA to a substrate, where the HMA resolidifies upon cooling.

U.S. Pat. No. 8,389,117 discloses hot-melt adhesives, particularly useful for roll-applied shrink labels, that comprise a low molecular weight polyester comprising residues of 1,4-cyclohexanedicarboxylic acid; at least two diols chosen from 1,4-cyclohexanedimethanol, triethylene glycol, and diethylene glycol; and optionally a tackifier, plasticizer, wax, or a nucleator. The adhesives can be applied at temperatures cool enough to prevent curling and premature shrinkage of the label during seaming, producing strong label seams that withstand the elevated temperatures of a shrink tunnel without sacrificing line speed.

U.S. Pat. No. 9,469,791 discloses a hot melt adhesive composition based on a semicrystalline polypropylene copolymer having a propylene content of least 80 mole % and comprising a co-monomer selected from ethylene and/or C4 to C20 alpha olefins, wherein the onset of nucleation of the composition occurs at temperatures above 80° C.

WO 1998/003603 discloses packages, cartons, cases, and trays made with a hot melt adhesive comprising at least one homogenous linear or substantially linear ethylene polymer having a melt viscosity at 350° F. (177° C.) of from 3500 to 6000 centipoise; up to 60 weight percent wax and up to 40 weight percent tackifier.

U.S. Pat. No. 6,794,443 discloses a low application temperature, high heat resistant hot melt adhesive that can be applied at temperatures of from about 100° C. to about 135°

C. comprising an ethylene vinyl acetate and/or ethylene 2-ethyl hexyl acrylate polymer, a paraffin wax and a rosin derived tackifier.

US 2007/0088116 discloses a hot melt adhesive composition, comprising an elastomeric block copolymer, preferably styrene-isoprene-styrene (SIS) or styrene-butadiene-styrene (SBS), and a midblock tackifying resin, i.e., a block copolymer comprising a rubbery oligomeric middle block and ends comprising a polyvinyl aromatic block, derived from petroleum feedstock having a softening point of at least 110° C. and having an aromatic content of at least 1.5% by weight, and a plasticizer.

Hot melt adhesives have been used in securing gaskets or in forming gaskets, which are well known for preventing passage of a number of substances, including gasses, oils, water, etc.

US 2007/0421993 discloses a hot melt adhesive or sealant which can be applied as a foam-in-place gasket composition comprising a rubber, e.g., ethylene propylene rubber (EPR) and/or ethylene propylene diene monomer rubber (EPDM), and at least one semicrystalline olefinic polymer. The composition is useful as a replacement for pressure sensitive adhesive (PSA) coated foam tape.

JP H04-110381 discloses a hot-melt gasket composition comprising a reactive elastomer consisting of a carboxyl-modified styrene/ethylene/butylene/styrene block copolymer or a styrene/butadiene/styrene block copolymer, and a process oil as a softening agent.

JP5714942 discloses a hot melt resin composition comprising a polyolefin resin having a weight-average molecular weight of 20,000-80,000, a high-molecular weight polypropylene, an adhesion-imparting agent, a polyolefin wax, and a filler. The composition has good electric insulating properties and thermal conductivity, and is suitable for sealing electric/electronic parts having a complicated shape.

CN 102576822 discloses a polyamide hot-melt adhesive with strong adhesion to non-polar materials, such as PE and PP, useful as a sealing material for electronic and electrical products.

Adhesives or sealants must often possess high impact, heat, and chemical resistance. U.S. Pat. No. 10,550,224 discloses polyester pressure-sensitive adhesives with improved impact resistance, drop resistance, and chemical resistance, and PSA tapes comprising the adhesives. Chemical resistance of adhesives, comprising different polyester backbones, against terephthalic acid, isophthalic acid, adipic acid, sebacic acid, ethylene glycol, 1,6-hexanediol, neopentyl glycol, 1,4-cyclohexane dimethanol, trimethylolpropane, and trimethylolpropane monoallyl ether was demonstrated by exposure of the adhesive to separate solutions of each chemical substance in a solvent comprising 70% isopropanol and 30% water.

In addition to high resistance to chemicals, e.g., organic solvents, etc., handheld or wearable electronic devices are in regular contact with people and must be resistant to materials such as oleic acid from fats and soaps, ammonia from cleaners, sebum from body oils, solvents from perfume and bug spray, along with chlorinated, salty, or soapy water, and other substances encountered by a person on a daily basis.

U.S. Pat. No. 8,734,939 discloses a thermally reversible polyester comprising a primary polymer with molecular weight between 2,000 to 7,000 Daltons (Da), useful in adhesives. "Primary polymer" denotes the major formulation component that drives the material properties of an adhesive. The reversible nature of the polyester is due to the presence of dienes and dienophiles that react with each other to form, e.g., crosslinks. Raising the temperature above the disassociation temperature will reverse the reaction between diene and dienophile, thus breaking the crosslinking bonds. The application temperature of the adhesive is typically 20-60° C. above the diene/dienophile bond dissociation temperature, which dissociation temperature is preferably above 80° C., more preferably above 100° C. This material is therefore not suitable for use in many electronic devices and components that require assembly at temperatures<80° C.

Hot melt adhesives provide environmental benefits relative to many other adhesives. They do not contain hazardous air pollutants (HAPS) from the solvents present in many other adhesives, and may be reusable, that is, HMAs can be reheated and re-cooled without losing adhesive strength and other desirable properties. They can also be formulated to possess various desirable properties.

A hot melt adhesive that has good impact resistance and chemical resistance and can be applied at temperatures below 85° C. or 80° C. is in demand, especially for electronic devices. Such an adhesive that also has resistance to body oils, fats, detergents and other materials that people come into contact with daily would provide a major advantage in the manufacture of handheld and wearable electronic devices.

BRIEF SUMMARY OF THE INVENTION

Provided is a hot melt adhesive composition comprising 60-97% by weight, based on the total weight of the composition, of an amorphous polyester and/or polypropylene with a Tg≤0° C., for example, 60-97% by weight, of an amorphous polyester with a Tg≤0° C., wherein the Loss Modulus of the adhesive at 20° C. and at an oscillation frequency of 10 kiloHertz is greater than 25 MPa In many embodiments, the modulus properties of the adhesive will have a tan δ at a frequency of one Hertz from 0.2 to 0.6 and at a frequency of 10 kiloHertz between 0.6 and 1.8.

One embodiment provides a hot melt adhesive composition comprising
  60 to 90% by weight of an amorphous polyester resin and/or polypropylene with a Tg≤0° C.;
  5 to 35% by weight of a crystalline or semi-crystalline polyester resin with a Tg of −50° C. to 0° C.;
  1 to 5% by weight of an amorphous polyester resin with a Tg≥50° C.;
  wherein all weights are a percent by weight based on the total weight of the composition;
  wherein the resins reflow and bond at about 40° to about 80° C.; and
wherein the Loss Modulus of the adhesive at 20° C. and at an oscillation frequency of 10 kiloHertz is greater than 25 MPa.

Another embodiment provides a hot melt adhesive composition comprising
  60 to 90% by weight of an amorphous polyester resin with a Tg≤0° C.; 5 to 35% by weight of a crystalline or semi-crystalline polyester resin with a Tg of −50° C. to 0° C.;
  1 to 5% by weight of an amorphous polyester resin with a Tg≥50° C.;
  wherein all weights are a percent by weight based on the total weight of the composition;
  wherein the polyester resins reflow and bond at about 40° to about 80° C.; and wherein the Loss Modulus of the adhesive at 20° C. and at an oscillation frequency of 10 kiloHertz is greater than 25 MPa.

The weight average molecular weights of the polyesters in the present adhesive is preferred to be from about 7,000 to about 120,000 Da, e.g., from about 9,000 to about 120,000, about 14,000 to about 110,000, or about 40,000 to about 110,000 Da.

In many embodiments of the invention, the hot melt adhesive comprises:

60 to 90% by weight of an amorphous polyester resin with a Tg≤0° C.;
5 to 35% by weight of a crystalline or semi-crystalline polyester resin with a Tg of −50° C. to 0° C.;
1 to 5% by weight of an amorphous polyester resin with a Tg≥50° C.; and other optional substances that may be present in addition to the polyester resins, for example:
0 to 5%, e.g., 1 to 5% by weight of a colorant such as a pigment or dye;
0 to 10%, e.g., 1 to 10% by weight of a wax;
0 to 7.5%, e.g., 0.1 to 6% by weight of a crosslinker; and/or
0 to 6% e.g., 1 to 6%, by weight polypropylene;

wherein all weights are a percent by weight based on the total weight of the composition;
wherein the polyester resins reflow and bond at about 40° to about 80° C.; and the Loss Modulus of the adhesive at 20° C. and at an oscillation frequency of 10 kiloHertz is greater than 25 MPa.

In many embodiments, the modulus properties of the adhesives above have a tan δ at a frequency of one Hertz of from 0.2 to 0.6 and at a frequency of 10 kiloHertz between 0.6 and 1.8.

Mineral oils and hydroxyl-phenoxy resins with Tg<100° C. may also be present.

The present adhesive has excellent physical properties and activates at lower temperature than most hot melt adhesives. For example, the low activation-energy polyester-based resins reflow and bond at about 40° to about 80° C. or 85° C., about 60° to about 80° C., or at about 65° C. Bonding with the adhesives of the present invention can therefore be done at ≤85° C., ≤80° C., ≤70° C., or ≤65° C., a temperature at which the housing parts of an electronic device can be bonded without damaging the internal components.

There is a preference to move toward easily de-constructable mono-layer materials rather than layered materials, e.g., laminates, which are unlikely to be compostable or recyclable. The leftover scrap from layered adhesives cannot be reused.

In addition to high impact resistance and broad chemical resistance, the hot melt adhesives of the present invention are effective without additional laminate layers, are applied without solvents, avoiding VOC emissions, and are reusable These and other objects, advantages, and features of the invention will become apparent to those persons skilled in the art upon reading the details of the formulations and methods as more fully described below.

DETAILED DESCRIPTION OF THE INVENTION

Figure 1:
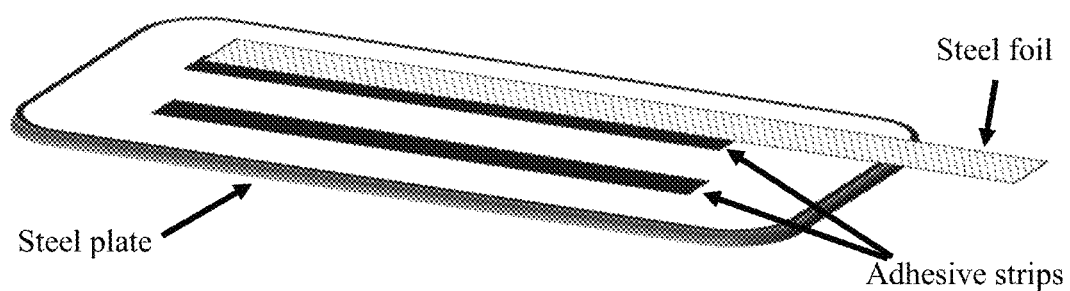
FIG. 1 illustrates a coupon used as a sample for the 180° Peel test showing adhesive strips on a steel support, which adhesive strips are also attached to strips of stainless-steel foil.

The present invention provides a low activation-energy hot melt adhesive (HMA) formulation that improves upon, and potentially replaces, current pressure sensitive adhesive tapes used for sealing electronic devices. The HMA of the invention imparts good chemical resistance; has environmental advantages, e.g., can be reused and is potentially compostable; and has a unique modulus profile that imparts high impact resistance. These enhancements are all achieved in a low activation-energy hot melt adhesive formulation.

For example, by designing the material properties so the adhesive activates at lower temperature than other hot melt adhesives, the bonding of temperature sensitive devices can occur at ≤80° C., or ≤65° C. This low-temperature bonding offers a great advantage over traditional HMAs that require temperatures of >100° C. for bonding, since those cannot be used for sealing temperature-sensitive electronic devices. In one embodiment, the low activation-energy polyester-based resins, and the adhesive compositions, reflow and bond at 40° C. to 80° C. or 60° C. to 80° C. or at about 65° C., a temperature at which the housing parts of an electronic device can be bonded without damaging internal components.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spun-bond non-woven fabrics (e.g. consisting of polypropylene, polyester, and the like) glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Herein, "Hot Melt Adhesive" (HMA) refers to formulations that are comprised of typically one or more structural or base polymers and one or more adjuvants (also refer to as additives). Polymers used for hot melt adhesives are usually comprised of ethylene-vinyl acetate, polyolefins, polyamides, polyesters, styrene block copolymers, polyethylene, and ethylene-methyl acrylate or ethylene n-butyl acrylate. Adjuvants typically include functional materials or diluents such as tackifying resins, plasticizers, fillers, de-blocking agents, oils and waxes or other low molecular weight polymers.

As used herein, "hydroxyl value" is defined as the number of milligrams of potassium hydroxide (KOH) required to neutralize the acetic acid taken up on acetylation of one gram of a chemical substance that contains free hydroxyl groups. Hydroxyl value is reported as mg KOH/g.

Herein, "activation-energy" refers to the thermal energy that must be reached for end or side groups of a polymer, such as hydroxyl [OH-] or isocyanate [NCO—], to chemically interact with other polymer chains or other parts of the same chain.

Herein, we refer to the "weight average molecular weight", Mw, generically as molecular weight. To address the variance in chain length between molecules, Mw provides the mean weight of those molecules with an equal weight of molecules on either side of Mw in the distribution. The weight average molecular weight is mathematically derived as $Mw=\Sigma Ni*Mi^2/\Sigma Ni*Mi$, where Mi is the molecular weight of a chain and Ni is the number of chains of that molecular weight. The molecular weight is reported in Daltons (Da), which is also known as an atomic mass unit or amu. A Unit Dalton is also approximately numerically equal to the molar mass of the same expressed in grams per mole (Da≈1 g/mol).

Herein, we refer to "Cold Flow" as the viscous flow or plastic deformation of a solid at room temperature. Cold flow appears more quickly as a distortion of a solid under sustained pressure that is unable to return to its original dimensions when the pressure is removed.

Herein, we refer to the "impact resistance" of a polymeric adhesive. Impact tests for adhesives commonly described in the literature provide information on the shear impact failure such as the "block shear" and "impact-wedge" tests. Many of the patents referenced above accommodate shear failure through the design of the device. For the purposes of a sealing gasket, we focus upon the impact-tensile strength of a 200 μm thick adhesive where the adhesive's ratio of height to width is 1 to 10. "Impact tensile strength", or "impact strength", is used interchangeably below with "impact resistance". Impact resistance of the polymer is defined as the measurable amount of energy needed to separate bonded parts and is reported as milli-Joules per centimeter squared, $mJ/cm^2$. The energy is in milli-Joules, and $cm^2$ is the 'bond area' of the gasket, which relates to the interfacial area of the adhesive that is in contact with the substrates. The energy (Joules) equals the drop height (in meters) times the mass being dropped (in kilograms) times the gravitational acceleration, 9.81 $m/s^2$. The test method provided in the Examples section measures the impact resistance by determining the mean failure energy (MFE) of a group of bonded coupons. The impact energy per bond area targeted for handheld and wearable electronic devices is typically 300 $mJ/cm^2$ to 600 $mJ/cm^2$. Exceeding 300 $mJ/cm^2$ is a desirable advantage for device manufacturers.

Herein, the chemical resistance of the polymeric adhesive is defined as the measurable amount of cohesive and adhesive strength that bonded parts retain following an exposure to a chemical for a specified time and temperature. Two methods are provided below, one for chemical exposure and another for water immersion, that allow one to compare the resistance of different adhesive formulations. Following the respective exposure or immersion, the bond is subjected to an impact energy test. The target impact energy requirements, following chemical exposure or water immersion, depend upon the chemical and the specifications for a given application, whether that be an earpiece, wristwatch, phone, or other wearable device. While one type of device may be exposed to body oils, like sebum, for up to 24 hours on a given day, the exposure to solvents from perfume could last seconds. In this case, the target for impact strength following perfume exposure may target 60 mJ/cm², while the target following body oil exposure may be 300 mJ/cm². These targets are determined by the manufacturers. Retention of adhesion and the degree of resistance, following exposure and immersion, are what is demonstrated below.

Herein, we refer to various "modulus" properties of viscoelastic adhesive materials as a function of their composition. Specifically, the relevant properties of viscoelastic materials are found within their complex modulus as measured over different oscillation frequencies. This is described by the ratio of stress to strain under vibratory conditions. In purely elastic materials the stress and strain occur in phase, so that the response of one occurs simultaneously with the other. In purely viscous materials, there is a phase difference between stress and strain, where strain lags stress by a 90-degree phase lag. Phase difference is also referred to as phase angle herein. Viscoelastic materials exhibit behavior somewhere in between that of purely viscous and purely elastic materials, exhibiting some phase lag in strain. The complex modulus, $E^*$, is comprised of the storage and loss modulus, represented by $E'$ and $E''$ respectively with the relation defined as $E^*=E'+iE''$. Essentially, a material's modulus describes its resistance to movement. The complex modulus discerns the two specific resistances of a material, the storage and loss moduli. The storage modulus embodies the elastic portion of the complex modulus. It exhibits itself as a perfect spring, which can be elongated but then returns to its original shape. There is no energy loss from this spring component unless a brittle fracture occurs. Whereas, the loss modulus provides the in-elastic portion of the complex modulus. It embodies the fluidity of a material, where plastic deformation energy is dissipated as heat. The ratio of the loss modulus to storage modulus in a viscoelastic material is defined as the tan δ, which provides a measure of damping in the material. Tan δ can also be visualized as the tangent of the phase angle between the storage and loss modulus. For a material with a tan δ less than 1, $E'$, the elastic modulus dominates. For a material with a tan δ greater than 1, $E''$, the energy-dissipating, viscous component prevails. A parallel explanation is that as the measured phase angle drops below 45 degrees, a material's $E'$ increasingly becomes the dominant resistance to deformation. Inversely, as the phase angle rises above 45 degrees, a material's $E''$ increasingly becomes the dominant resistance to deformation.

Damping is a restraint of vibratory motion, such as mechanical oscillation, noise, or alternating electric current through energy dissipation. A material, e.g., a gasket, adhesive, etc., can convert motion energy into deformation energy. For example, if a device falls or is dropped, a gasket can absorb the energy across the gasket and dampen the drop frequency forces while maintaining or preserving the device's integrity. If the fall or drop forces overcome the damping energy mechanism, then the adhesive or gasket will fail. In the present invention, certain hot melt adhesives are used to form a gasket with excellent damping properties.

Compositions and Uses Thereof

The present invention improves the durability and sealing of handheld and wearable electronic devices by reflowing a low activation-energy polymeric matrix, to form a robust seal around a device. By designing the material properties so the adhesive activates at lower temperature, bonding of temperature sensitive devices can be done at ≤85° C., or ≤70° C. This low-temperature bonding offers a great advantage over traditional HMAs that require temperatures of >100° C. for bonding, since those cannot be used for sealing temperature-sensitive electronic packages.

The invention provides a hot melt adhesive composition comprising 60 to 97% by weight, based on the total weight of the composition, of an amorphous polyester and/or polypropylene with a Tg≤0° C., for example, 60 to 97% by weight, of an amorphous polyester with a Tg≤0° C., wherein the Loss Modulus of the adhesive at 20° C. and at an oscillation frequency of 10 kiloHertz is greater than 25 MPa.

In many embodiments, the modulus properties of the adhesives above have a tan δ at a frequency of one Hertz of from 0.2 to 0.6 and at a frequency of 10 kiloHertz between 0.6 and 1.8.

One embodiment provides a hot melt adhesive composition comprises:
  60 to 90% by weight of an amorphous polyester resin and/or polypropylene with a Tg≤0° C.;
  5 to 35% by weight of a crystalline or semi-crystalline polyester resin with a Tg of −50° C. to 0° C.;
  1 to 5% by weight of an amorphous polyester resin with a Tg≥50° C.;
  wherein all weights are a percent by weight based on the total weight of the composition; wherein the resins reflow and bond at about 40° to about 80° C.; and
  wherein the Loss Modulus of the adhesive at 20° C. and at an oscillation frequency of 10 kiloHertz is greater than 25 MPa and/or the modulus properties of the adhesive have a tan δ at a frequency of one Hertz of from 0.2 to 0.6 and at a frequency of 10 kiloHertz between 0.6 and 1.8.

Other, optional components that may be present in the above compositions include:
  0 to 5% by weight of a colorant such as a pigment or dye;
  0 to 10% by weight of a wax; and/or
  0 to 7.5% by weight of a crosslinker.

Another embodiment provides a hot melt adhesive composition comprising:
  60 to 90% by weight of an amorphous polyester resin with a Tg≤0° C.;
  5 to 35% by weight of a crystalline or semi-crystalline polyester resin with a Tg of −50° C. to 0° C.;
  1 to 5% by weight of an amorphous polyester resin with a Tg≥50° C.;
  wherein all weights are a percent by weight based on the total weight of the composition;
  wherein the polyester resins reflow and bond at about 40° to about 80° C.; and
  wherein the Loss Modulus of the adhesive at 20° C. and at an oscillation frequency of 10 kiloHertz is greater than 25 MPa, and/or wherein the modulus properties of the adhesive have a tan δ at a frequency of one Hertz of from 0.2 to 0.6 and at a frequency of 10 kiloHertz between 0.6 and 1.8.

The weight average molecular weights of the polyesters in the present adhesive is preferred to be from about 7,000 to about 120,000 Da, e.g., from about 9,000 to about 120,000, about 14,000 to about 110,000, or about 40,000 to about 110,000 Da.

In many embodiments of the invention, the hot melt adhesive comprises:

60 to 90% by weight of an amorphous polyester resin with a Tg≤0° C.;

5 to 35% by weight of a crystalline or semi-crystalline polyester resin with a Tg of −50° C. to 0° C.;

1 to 5% by weight of an amorphous polyester resin with a Tg≥50° C.;

and other optional substances, for example, many embodiments may comprise:

0 to 5% by weight of a colorant such as a pigment or dye;
0 to 10% by weight of a wax;
0 to 7.5% by weight of a crosslinker; and/or
0 to 6% by weight polypropylene;

wherein all weights are a percent by weight based on the total weight of the composition;

wherein the polyester resins reflow and bond at about 40° to about 80° C.; and wherein the Loss Modulus of the adhesive at 20° C. and at an oscillation frequency of 10 kiloHertz is greater than 25 MPa, and/or wherein the modulus properties of the adhesive have a tan δ at a frequency of one Hertz of from 0.2 to 0.6 and at a frequency of 10 kiloHertz between 0.6 and 1.8.

In some embodiments, mineral oils and/or hydroxyl-phenoxy resins with Tg<100° C. may also be present.

In most embodiments, the hot melt composition reflows and bonds at about 40° to about 80° C.

For example, the hot melt adhesive of the invention comprises:

55 to 90%, e.g., 60 to 85% by weight of an amorphous polyester resin with a Tg of ≤0° C.;

5 to 35%, e.g., 10 to 30% by weight of a crystalline or semi-crystalline polyester resin with a Tg of about −50° C. to about 0° C., about −40 to about −10° C., or about −30 to about −20° C.;

1 to 5%, e.g., about 1.5 to about 3% by weight of an amorphous polyester resin with a Tg≥50° C., 50 to about 100° C., or about 56 to about 75° C.; and optionally, 1 to 5%, e.g., 1.5 to 4% by weight of a colorant such as a pigment or dye;

1 to 8%, e.g., 1.5 to 6% by weight of a wax;
to 7% e.g., 0.1 to 6% by weight of a crosslinker; and/or
to 6% by weight polypropylene;

wherein all weights are a percent by weight based on the total weight of the composition;

wherein the weight average molecular weight of the polyesters are from about 7,000 to about 120,000 Da, e.g., from about 9,000 to about 120,000, about 14,000 to about 110,000, or about 40,000 to about 110,000 Da;

wherein the polyester resins and the composition reflow and bond at about 40° to about 80° C.; and wherein the Loss Modulus of the adhesive at 20° C. and at an oscillation frequency of 10 kiloHertz is greater than 25 MPa.

In many embodiments, the modulus properties of the adhesives above have a tan δ at a frequency of one Hertz of from 0.2 to 0.6 and at a frequency of 10 kiloHertz between 0.6 and 1.8.

Polyester resins of the invention are commercially available and can be supplied by, for example, Ingevity, PolyOne, Bostik, DuPont, Dow Chemical, Eastman Chemical, Sekisui, Evonik, Covestro, Stepan and Mitsubishi Chemical.

Polypropylene resins of the invention are also commercially available and can be supplied by Flint Hills, INEOS, Pinnacle and Lyondell Basell.

Examples of polyesters useful in the present invention include: poly(butylene isophthalate); poly(butylene adipate); poly(butylene sebacate); poly(butylene succinate); poly(butylene terephthalate); poly(ethylene adipate); poly(ethylene sebacate); poly(ethylene succinate); poly(ethylene phthalate); poly(ethylene naphthalate); poly(ethylene terephthalate); poly(cyclohexylenedimethylene terephthalate); poly(ethylene isophthalate); poly(caprolactone); poly(hexylene sebacate); poly(hexylene succinate); polyglycolide; or a combination of the above.

Although polyester resins are often used in solvent-based adhesives, the present invention is the first time that these high MW polyester resins have been shown to be suitable as hot melt adhesive resins. The hot melt adhesive gasket of the present invention is unique due to its use of high MW polyester as defined herein; the combination of the raw materials produces a flowable hot melt adhesive, which can be pumped and slot die-coated while maintaining high MW of the polyesters. The adhesive of the invention is a structural adhesive, has a high frequency modulus, pressure-sensitive characteristics, damping and elastic properties ideal for the gasket industry.

In one embodiment, the polyesters are hydroxyl terminated, with a hydroxyl number of from 1 to 7 or 1 to 5 mg KOH/g.

In one embodiment, polypropylene resins are added to meet the chemical resistance property requirements of the final adhesive. The polypropylene could be atactic polypropylene (PP-at), syndiotactic polypropylene (PP-st) and/or isotactic polypropylene (PP-it). The polypropylene preferably has a melt temperature of <150° C., and more preferably <130° C. It is preferred to have a melt mass-flow rate, at 230° C. and under a 2.16 kg load, of >100 grams/minute, more preferably >500 g/min, and most preferably >1000 g/min.

In one embodiment, hydroxyl-phenoxy resins with Tg<100° C. are added to meet the chemical resistance property requirements of the final adhesive.

Crosslinking agents can optionally be used in the formulation to meet the modulus or elastic material property requirements of the final adhesive. The crosslinker mainly reacts with the unreacted hydroxyl and acid groups in a polyester, forming bridges between different units of hydroxyl and acid groups. Useful crosslinking agents for this application comprise isocyanate, amines, epoxy, and carbodiimide. Isocyanate could be hexamethylene diisocyanate (HDI); isophorone diisocyanate (IPDI); Bis-(4-isocyanatocyclhexyl)methane (H12MDI)); 2,4 and 2,6-toluene diisocyanate (TDI); diphenylmethane-4,4'-diisocyanate; diphenylmethane-2,4'-diisocyanate (MDI); xylylene diphenylmethane diisocyanate (XDI); hydrogenated xylylene diphenylmethane-4,4'-diisocyanate; 2,2,4-tirmehtyl-1,6-diphenylmethane-4,4'-diisocyanatohexane; triisocyatononane; triphenylmethane-4,4',4"-triisocyanate; tris(p-isocyanatophenyl)thiophosphate. They could be blocked isocyanate so the reaction temperature could be accurately controlled. Polycarbodiimide could be of different molecular weights, Carbodilite® V-05, V-02B, and V-04K from Nisshinbo, for example.

Wax may also be used in the formulations to derive the rheological and cohesive strength property requirements of the final adhesive. Useful wax types for this application comprise Fischer-Tropsch waxes, Montanwax, amide, polyethylene, polypropylene or vinyl acetate. The wax's melting point is preferred to be <150° C., more preferably <110° C., and most preferably <95° C.

Fischer-Tropsch waxes are synthetic waxes produced from natural gas and air using the Fischer-Tropsch process. They consist mainly of unbranched hydrocarbon chains and have a linear structure, which results in a low viscosity. They exhibit an increased hardness and high temperature resistance compared to other waxes.

In one embodiment mineral oil can be added to the formulation to meet the rheological property requirements of the final adhesive.

In one embodiment, one or more colorants can be added to the formulation to meet the specific optical property requirements of the final adhesive. Suitable colorants include but are not limited to organic or inorganic pigments and dyes. The dyes include but are not limited to fluorescent dyes, azo dyes, anthraquinone dyes, xanthene dyes, azine dyes, combinations thereof and the like. Inorganic carbon black, oxide pigments and/or organic dyes can be added into the formulation. For example, a fluorescent pigment can be added as a marker to identify the location of a transparent adhesive.

In one embodiment, the adhesive is comprised of one or more polymeric resins, a crosslinking agent, a wax, and a pigmenting system.

The hot melt adhesive can be dispensed using traditional HMA techniques such as nozzle dispensing, slot-die, extrusion or roll coating at elevated temperatures. The HMA can be injected through a nozzle into the shape of the gasket. A typical dispensing machine could be Nordson Robot E3V, Graco UniXact Precise Dispensing System, or a Techcon TS250 dispenser. Alternatively, slot-die, extrusion or roll coating equipment is available from ITW Dynatec and other equipment suppliers. While nozzle-dispensed or injected gaskets can be made to a desired gasket geometry, slot-die deposited sheets of the adhesive can be die or laser cut to a desired gasket geometry.

Slot-die deposited adhesive sheets are tacky but easily transfer from a release liner with minimal pressure to metal, glass, or plastic device substrates. The gasket is transferred off the liner and onto one substrate of the device housing. After the device is closed, the region where the adhesive is located is brought to an appropriate temperature to reflow the adhesive onto the device substrates. Depending upon the part geometry and thermal conductivity of the device housing, the reflow time can be as little as 30 seconds. Bond strength builds upon cooling and the gasket obtains its mechanical, chemical, and sealing properties. Chemically, the bonds to the substrates are thought to be Van der Waals. If the device substrates are primed with an adhesion promoter comprising, e.g., amino-functionality, amines from the primer can bond to the polyester resulting in chemical bonding.

Examples

The present invention is further described by the following non-limiting examples, which further illustrate the invention, and are not intended to, nor should they be interpreted to, limit the scope of the invention.

The materials used in preparing the hot melt adhesives in the Example are shown in TABLE 1. In the table, PES stands for polyester; PP stands for polypropylene; MO stands for mineral oil; and XL stands for crosslinker.

TABLE 1

Materials Used in Examples

| Abbreviation | Raw Material | Vendor |
| --- | --- | --- |
| PES-1 | Vitel ® 1801 | Bostick |
| PES-2 | Vitel ® 2200B | |
| PES-3 | Vitel ® 3550B-M | |
| PP | Metocene ® MF650Y | Lyondell Basell |
| Pig | SunCroma ® C335000 | Sun Chemical |
| Wax-1 | MP 22 | Micro Powders |
| Wax-2 | Viscowax ® 122 | Innospec |
| Wax-3 | Viscowax ® 261 | |
| MO | Drakeol 13 ® Mineral Oil | Calumet Refining |
| XL-1 | Desmodur ® BL 3370 MPA | Covestro |
| XL-2 | Desmodur ® BL 3475 BASN | |
| XL-3 | SunLam ® SFC100 | Sun Chemical |
| XL-4 | Carbodilite ® V-04K | Nisshinbo |

Vitel® 1801: is a semi-crystalline, linear, saturated copolyester resin
  Glass Transition (Tg): −20° C.
  Molecular Weight (Mw): 96,000
Vitel® 2200B: is an amorphous, thermoplastic, linear, polyester hard resin.
  DSC Tg: 69 (° C.)
  Molecular Weight (Mw): 47,000
Vitel® 3550B-M: is an amorphous, linear, saturated polyester resin used in solvent based adhesives
  Glass Transition, Tg: −11° C.
  Molecular Weight (Mw): 75,000
Metocene® MF650Y: is a polypropylene homopolymer resin with narrow molecular weight distribution.
MP 22: is a micronized synthetic (Fischer Tropsch) wax.
Viscowax® 122: is a polyethylene wax.
Viscowax® 261: is an oxidized polyethylene wax.
Desmodur® BL 3370 MPA: is a blocked aliphatic polyisocyanate based on HDI.
Desmodur® BL 3475 BASN: is a diethyl malonate blocked, aliphatic HDI/IPDI-polyisocyanate.
Carbodilite® V: is polycarbodiimide crosslinking agent.

Preparation of Hot Melt Adhesives

The HMA formulations listed in TABLE 3 were made using an unlined paint can placed within a heating mantle (Glas-Col Model 100 B CH0097) and mixed with a stir shaft (Cowles blade, propeller, or combination) driven by a mixing head (Caframo Real Torque Digital Stirrers BDC3030). A PLC heating unit (Chemglass Life Sciences Dual Temperature Controller, J-Kem, Apollo, Type "T") with a K-type thermocouple was used to control temperatures of the mixtures. (It is expected that in a manufacturing environment, the materials would be transferred into a nitrogen atmosphere and then mixed under vacuum). All materials were pre-weighed in separate containers before adding them into the mixing vessel.

Example 1. Preparation of Example 1 Hot Melt Adhesive

Step A-PES-3 was heated in the mixing vessel to 180° C., the mixer was started (slowly) when the temperature reaches about 120° C. Mixing was continued until the material reaches 180° C., and then for an additional 5 minutes. The mixing speed was then increased to produce a material that appeared uniformly mixed and had a uniform viscosity.

Step X—The pigment SunCroma® C335000 was then added while mixing at 180° C., and blended for 30 minutes, or until the pigment was completely dispersed into the matrix while maintaining the 180° C. temperature. Pigment dispersion was confirmed by spreading a 2 gram sample of the mixture thinly across a white piece of paper, and observing the result.

Once the pigment dispersion is achieved, the HMA must be packed out warm or it will solidify in the container. The material was cooled before testing.

Examples 2 to 4. Preparation of Examples 2 to 4 Hot Melt Adhesive

Step A was repeated as described above.

Step B-PES-2 was added to the vessel containing PES-3 while mixing at 180° C. and blended for 10 minutes, or until the PES-2 was completely dissolved into the matrix while maintaining the 180° C. temperature. (To prevent the material from climbing up the mixing rod, the mixing speed may need to be decreased for a time during the addition of PES-2.)

Step C-PES-1 was added to the vessel containing PES-3 and PES-2 while mixing at 180° C. and blended for 10 minutes, or until the PES-1 was completely dissolved into the matrix while maintaining the 180° C. temperature. (To prevent the material from climbing up the mixing rod, the mixing speed may need to be decreased for a time during the addition of PES-1.)

Step X was repeated as described above and the HMA was packed out warm once the pigment dispersion is achieved. The material was cooled before testing.

Examples 5 to 8. Preparation of Examples 5 to 8 Hot Melt Adhesive

Step A-C were repeated as described above.

Step D—The desired wax was added to the vessel while mixing at 180° C. and blended for 10 minutes, or until the wax was completely dissolved into the matrix while maintaining the 180° C. temperature.

Step X was repeated as described above and the HMA was packed out warm once the pigment dispersion is achieved. The material was cooled before testing.

Examples 9 to 11. Preparation of Examples 9 to 11 Hot Melt Adhesive

Steps A-D were repeated as described above.

Step E—Mineral oil was added to the vessel while mixing at 180° C. and blended for 10 minutes, or until the mineral oil is completely dispersed into the matrix while maintaining the 180° C. temperature.

Step X was repeated as described above and the HMA was packed out warm once the pigment dispersion is achieved. The material was cooled before testing.

Examples 12 to 16. Preparation of Examples 12 to 16 Hot Melt Adhesive

Steps A-D were repeated as described above.

Step F—A was crosslinker was added to the vessel while mixing at 180° C. and blended for 5 minutes, or until the crosslinker is completely dispersed into the matrix while maintaining the 180° C. temperature.

Step X repeated as described above and the HMA was packed out warm once the pigment dispersion is achieved. The material was cooled before testing.

Example 17. Preparation of Example 17 Hot Melt Adhesive

Steps A-C were repeated as described above.

Step G—Polypropylene was added to the vessel while mixing at 180° C. and blended for 10 minutes, or until the PP is completely dissolved into the matrix while maintaining the 180° C. temperature. (To prevent the material from climbing up the mixing rod, the mixing speed may need to be decreased for a time during the addition of PP.)

Step F—A crosslinker was added to the vessel while mixing at 180° C. and blended for 5 minutes, or until the crosslinker is completely dispersed into the matrix while maintaining the 180° C. temperature.

Step X was repeated as described above and the HMA was packed out warm once the pigment dispersion is achieved. The material was cooled before testing.

Examples 18 to 19. Preparation of Examples 18 to 19 Hot Melt Adhesive

Steps A-D were repeated as described above.

Step G—Polypropylene was added to the vessel while mixing at 180° C. and blended for 10 minutes, or until the PP is completely dissolved into the matrix while maintaining the 180° C. temperature. (To prevent the material from climbing up the mixing rod, the mixing speed may need to be decreased for a time during the addition of PP.)

Step F—A crosslinker was added to the vessel while mixing at 180° C. and blended for 5 minutes, or until the crosslinker is completely dispersed into the matrix while maintaining the 180° C. temperature.

Step X was repeated as described above and the HMA was packed out warm once the pigment dispersion is achieved. The material was cooled before testing.

Examples 20 to 22. Preparation of Examples 22 to 22 Hot Melt Adhesive

Steps A-D were repeated as described above.

Step F—A was crosslinker was added to the vessel while mixing at 180° C. and blended for 5 minutes, or until the crosslinker is completely dispersed into the matrix while maintaining the 180° C. temperature.

Step X repeated as described above and the HMA was packed out warm once the pigment dispersion is achieved. The material was cooled before testing.

Example 23. Preparation of Example 23 Hot Melt Adhesive

Steps A-D were repeated as described above.

Step X was repeated as described above and the HMA was packed out warm once the pigment dispersion is achieved. The material was cooled before testing.

Example 24. Preparation of Example 24 Hot Melt Adhesive

Steps A-D were repeated as described above.

Step F was repeated as described above.

Step X was repeated as described above and the HMA was packed out warm once the pigment dispersion is achieved. The material was cooled before testing.

Adhesive Sheet Preparation

Sheets of adhesive with a thickness of 200 to 250 μm were made by placing 6 g of the bulk adhesive between two "release liners", i.e., 75 μm thick polyethylene terephthalate (PET) sheets with silicone release coatings on at least one side, with the silicone release coatings in contact with the adhesive. Steel feeler gauges were used as spacers between the release liners, also referred to as RL, to achieve the desired adhesive film thickness. The resulting stack of liner, adhesive, liner was placed between two 6"×6" aluminum flat plates of a Carver hydraulic press, model #3912, heated between 50° C. and 100° C., preferably between 60° C. and 75° C., and the RL/Adhesive stack was pressed under a load of 4,500 Lbs for one minute. After removal from the press, the stack was cooled to room temperature on a flat bench.

The stacks or sheets above are processed to form the various shapes and sizes needed for the following tests.

Care should be taken when choosing silicone coated release liners. The liner needs to have minimal silicone transfer to the adhesive. Liners without a strong bond to their silicone layers can transfer silicone to the adhesive and exhibit much lower adhesive forces. In the present Examples, silicone-coated Mitsubishi Hostaphan grade 2HLKN liners were used and caused minimal degradation to the adhesive strength of the adhesive.

180° Peel Strength

Samples

HMA Samples-Coupons were assembled by cutting the RL/Adhesive/RL stack into strips 5 mm wide by 100 mm long. One of the release liners was removed to expose a side of an adhesive strip, which was attached to a stainless-steel (SUS) plate 2 mm thick, 50 mm wide, and 125 mm long. Following the same procedure, a second strip of adhesive was attached to the same steel plate, parallel to the first adhesive strip, to help balance the weight that was applied later. The remaining liners from the adhesive strips were removed, and separate 50 μm thick by 5 mm wide by 250 mm long strips of stainless-steel foil was attached to each adhesive strips. See FIG. 1.

The adhesive was bonded by placing the steel plate onto a 4 Kg steel thermal anchor that was pre-heated at 65° C. in a vented convection oven. A 65° C. pre-heated 867 g weight, imparting 0.085 MPa of pressure was placed across the two foil/adhesive strips to ensure a uniform bond, as in FIG. 2. After 120 seconds, the weight was removed, and the bonded test coupon was taken out of the oven and cooled to room temperature on a metal bench top. The bond solidified upon cooling.

For comparison, PSA tape samples were prepared two different ways. The first method, the Heat Bond Method (HBM), repeats the steps described above, the PSA tape was cut into strips, the adhesive was exposed and attached to the steel plate and strips of stainless-steel foil, and bonded with heat and pressure. The second method, the Pressure Bond Method (PBM), follows the Japanese standard JIS Z0237, wherein: PSA sheets were cut into a 5 mm wide by 100 mm long strip. Four strips were placed onto a 2 mm thick stainless-steel (SUS) substrate, and each was covered with a 50 μm thick by 5 mm wide by 250 mm long strip of SUS foil. A 2 Kg roller was passed five times over and back on the 4 strips simultaneously to form the test sample.

Given the large differences between PSA tapes and HMAs, we can only compare system-wide responses. Specifically, these PSA tapes are not mono materials but rather two acrylic adhesives that sandwich a PET foam core. This encompasses a 50 μm thick acrylic layer, a 100 μm foamed PET core and another 50 μm thick acrylic layer. To achieve the rigidity needed, ten PSA tapes were stacked up to get a total thickness of 2 mm.

The 180° Peel Test

Figure 3:
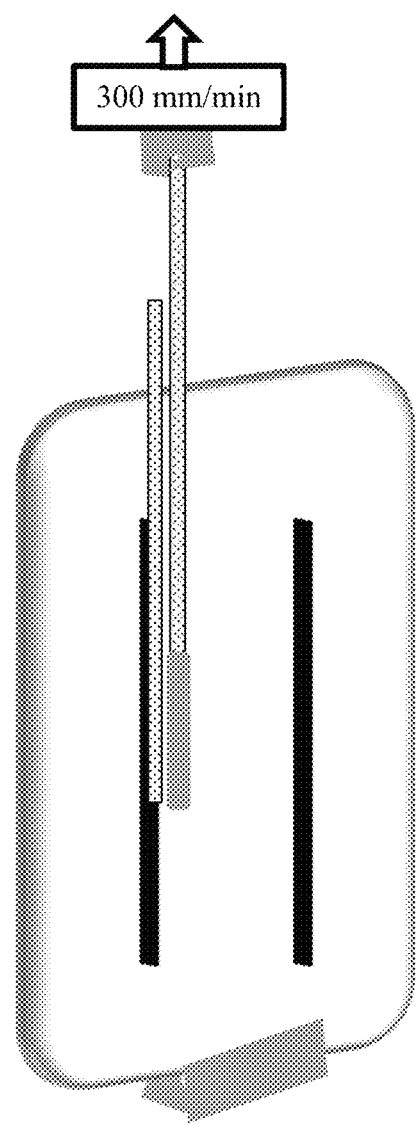
FIG. 3 shows the set-up for the 180° Peel test with the base of the steel plate supporting the adhesive strips attached to the bottom clamp of an Instron 3342 single column universal testing system and the steel foil lead fastened to the top clamp.

In the test, the base of the steel plate supporting the adhesive strips was attached to the bottom clamp of an Instron 3342 single column universal testing system with a 50N load cell as shown in FIG. 3. The loose steel foil lead was fastened to the top clamp. The top clamp was raised at a speed of 300 mm/min, and the 180° peel force was measured. Data was extracted from the middle 80 mm of the test strip to eliminate edge effects. The average force across that section was used to determine the 180° peel strength of the adhesive, reported in N/mm, where mm refers to the 5 mm width of the adhesive.

Impact Tensile Strength

Samples

Figure 4:
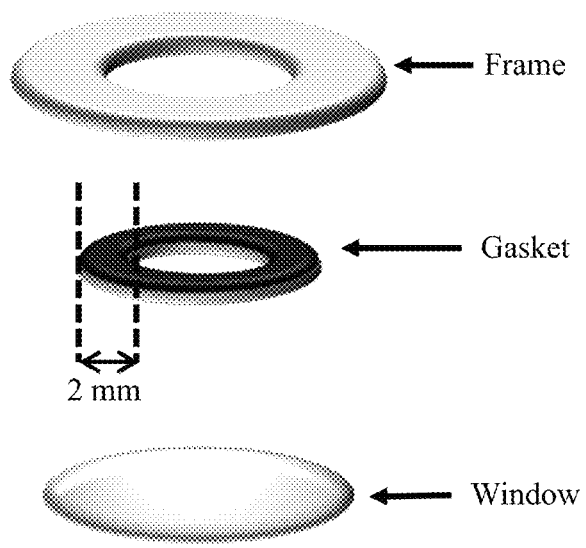
FIG. 4 shows the stack and location of the gasket between the Frame and Window substrates for the Impact Strength test. The dashed lines identify the inner and outer radius of the circular gasket, which define the 2 mm wide bond area of the gasket.

Coupons were assembled for Impact Tensile Strength testing in the following manner. Adhesive sheets, prepared using the hydraulic press method described above, were stacked between two release liners. A Keyence ML-Z9610, 3-Axis, CO2 laser system was used to cut through the top liner and adhesive layer of the stack. The gaskets were 2 mm wide and 200 μm thick to have an aspect ratio of 10 to 1. The top liner was removed, and the gasket was attached to a SUS 'Window' substrate. This was then placed inside a Teflon fixture designed to keep parts aligned during the attachment (pre-bonding) process. The second release liner was removed from the gasket sitting atop the Window. A SUS 'Frame' was placed atop the gasket into the fixture. The inner diameter of the Frame overlaps the outer diameter of the Window by 2 mm. This 2 mm band is referred to as the bond area. FIG. 4 shows the stack and location of the gasket between the Frame and Window substrates. For comparative example PSA tapes, the assembly process followed the above steps.

Figure 2:
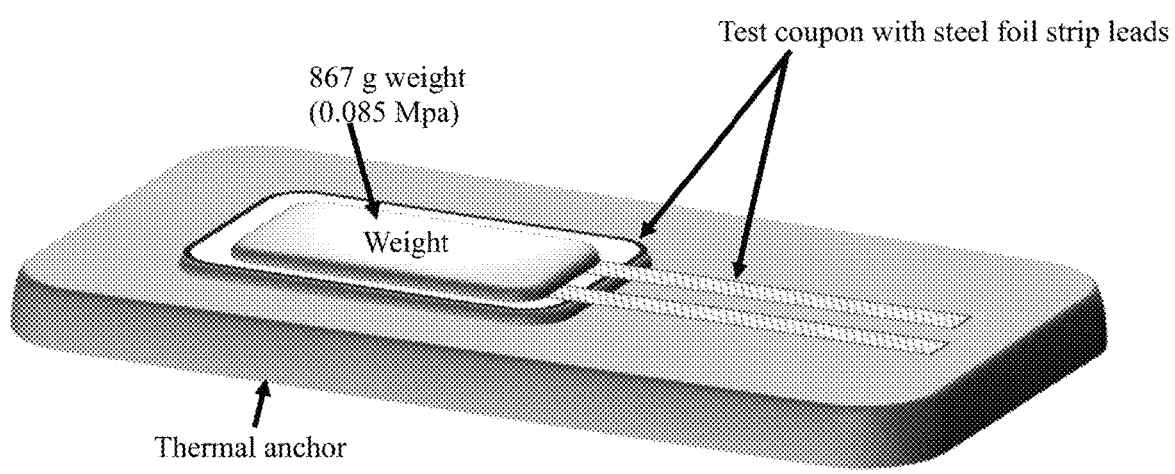
FIG. 2 shows the sample of FIG. 1 set on a thermal anchor with a weight heated to 65° C. set on the area where the adhesive strips are bonded to the steel support and the strips of stainless-steel foil.

To bond the Window and Frame, the stack was removed from the alignment fixture and was placed onto a pre-heated (65° C.) 3 Kg steel thermal anchor located in a 65° C. vented convection oven similar to the configuration shown in FIG. 2. A 65° C. pre-heated weight was placed on top of the coupon stack to impart a light pressure of 0.01 to 0.015 MPa to ensure a uniform bond. The coupons tested herein were removed after 60 or 90 seconds and cooled to room temperature on a non-conductive bench top. Increasing the bonding time to 90 seconds provided more uniform results. Bond times are indicated for each test below. For comparative example PSA tapes, instead of using heat to bond the parts, a pressure of 0.35 MPa was applied to the adhesive for 10 seconds as recommended by the manufacturer.

Impact Tensile Strength Test/Bruceton Staircase Method, ASTM D 5420-04

Figure 5:
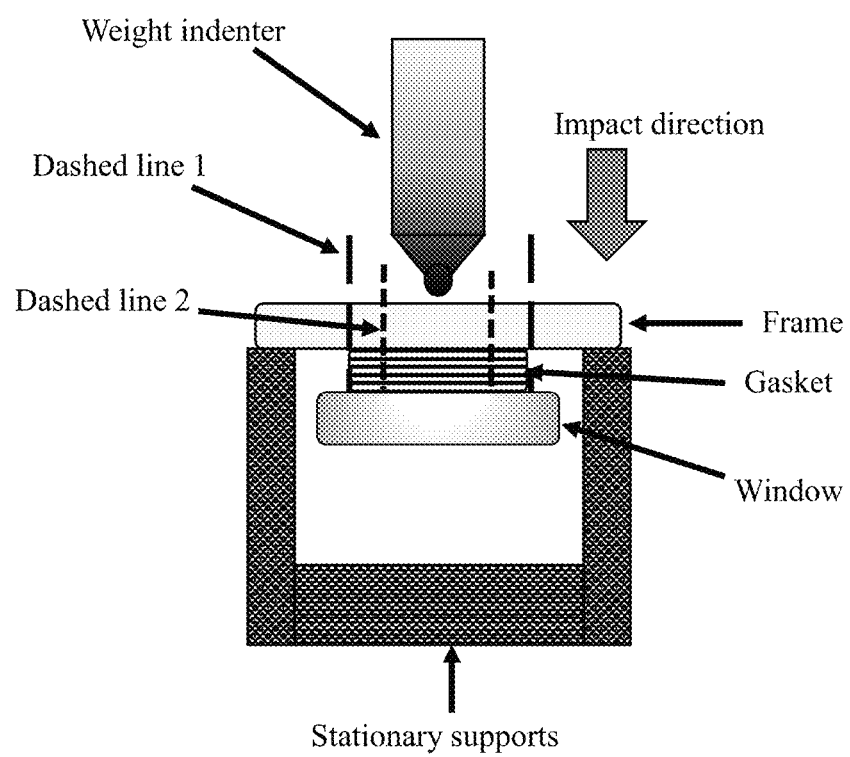
FIG. 5 shows a schematic of the device for measuring the impact tensile strength of the adhesive and the position of the frame/gasket/window of the test sample. Dashed line 1 identifies the outer radius of the circular gasket, and dashed line 2 identifies the inner radius of the circular gasket. A fixed weight indenter is dropped from various heights to determine the energy that will cause 50% of the specimens tested to fail.

To measure the impact tensile strength of the adhesive bond between an exterior Frame and an interior Window, a 2 Lb. striker within a guide tube was lifted and dropped onto the Window, while the rim of the Frame rests atop stationary supports. See FIG. 5. The dashed lines 1 identify the outer radius of the Frame and gasket in cross sections, and the dashed lines 2 identify the inner radius of the Frame and gasket in cross sections. The bond area had a width (measured from the inner radius to the outer radius) of 2 mm. A fixed weight was dropped from various heights to determine the energy (mass×gravity×height) that causes 50% of the specimens tested to fail, e. g., failure occurs when the window falls, signaling bond breakage.

The Mean-Failure Energy (MFE) reported in the tables below was normalized by the bond area. The technique used to determine the MFE is commonly called the Bruceton Staircase Method and is described in ASTM D 5420-04. The Impact Strength values reported in the tables were obtained using a Model 172 Gardco Universal Impact Tester (part number IM-172RF) with a Combination ½" Ball and 2 lbs. WT Indenter (IM-172-1).

Chemical Resistance
Samples

Figure 6:
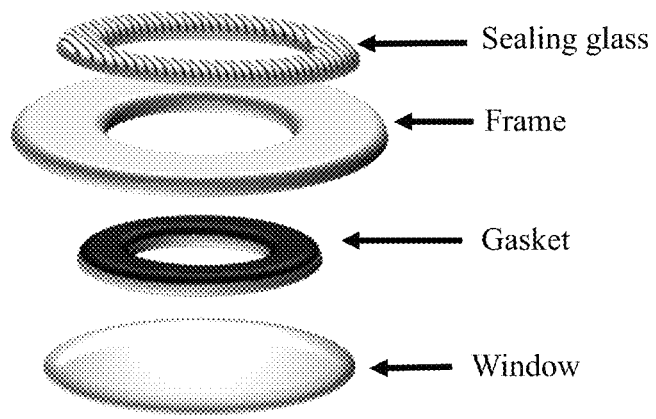
FIG. 6 illustrates the stack design of the test coupons for Chemical Resistance testing.

Coupons for Chemical Resistance testing were assembled and bonded in the same way as for the Impact Strength, with a few additional steps. Following the assembly and bonding, chemicals were placed into the reservoir within the Frame. All the chemicals used are commercially available, and included 100% Oleic acid purchased from Eisen-Golden Laboratories; Windex cleaner, Off Family Care Insect Repellent IV (unscented with aloe vera) and Calvin Klein Obsession perfume were purchased on Amazon; and synthetic Sebum was purchased from Scientific Services S/D. The chemicals were sealed into the reservoir with a sheet of glass as FIG. 6 depicts.

Chemical Resistance Test

The test coupons were placed into an environmental chamber held at 65° C. and 50% relative humidity (RH). One set of control coupons, without chemicals in the reservoir, was placed into the same chamber and another set of control coupons was held at 23° C. and 50% RH. Reservoirs were checked regularly to replenish any chemicals that evaporated. After three days, the test coupons were taken out of the environmental chamber and cooled to room temperature. The chemicals were removed, and the coupons were wiped clean with KIM wipes purchased from Kimtech. These test coupons were then subjected to the Impact Test method described above.

Immersion Resistance

Impact coupons were also used to evaluate Immersion Resistance in deionized (DI) water plus solutes of chlorine, salt, and soap. The coupons were assembled and bonded in the same way as for the Impact Strength test. Following the assembly and bonding processes, sets of coupons were fully submerged in dishes containing different solution. One dish contained DI water, another contained a 6 ppm concentration of chlorine in DI water, another contained a 4% table salt mixture with the DI water, and another dish contained a 0.1% concentration of Ivory dishwashing liquid in the DI water. With the impact coupons submerged in these solutions, the dishes were placed into an environmental chamber held at 40° C. and 50% RH. A set of control coupons were placed into the same chamber. After twenty days, the coupons and dishes were taken out, cooled to room temperature, the coupons were removed from the dishes and dried with KIM wipes. The coupons were then subjected to the Impact Test method described above.

Cold Flow

Figure 7:
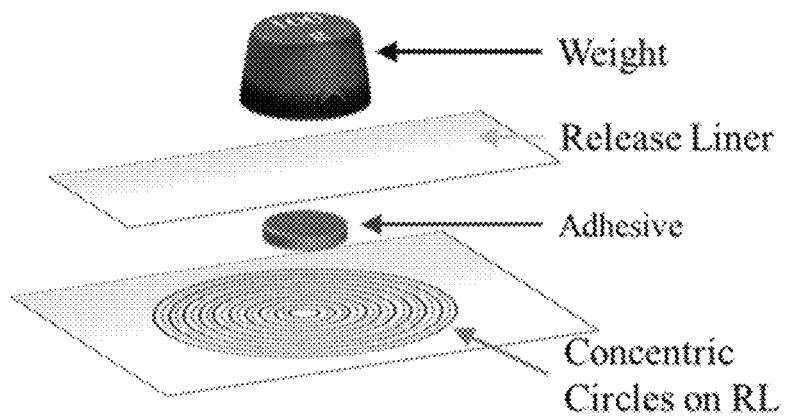
FIG. 7 shows the design of the apparatus for evaluating cold flow.
Figure 8A:
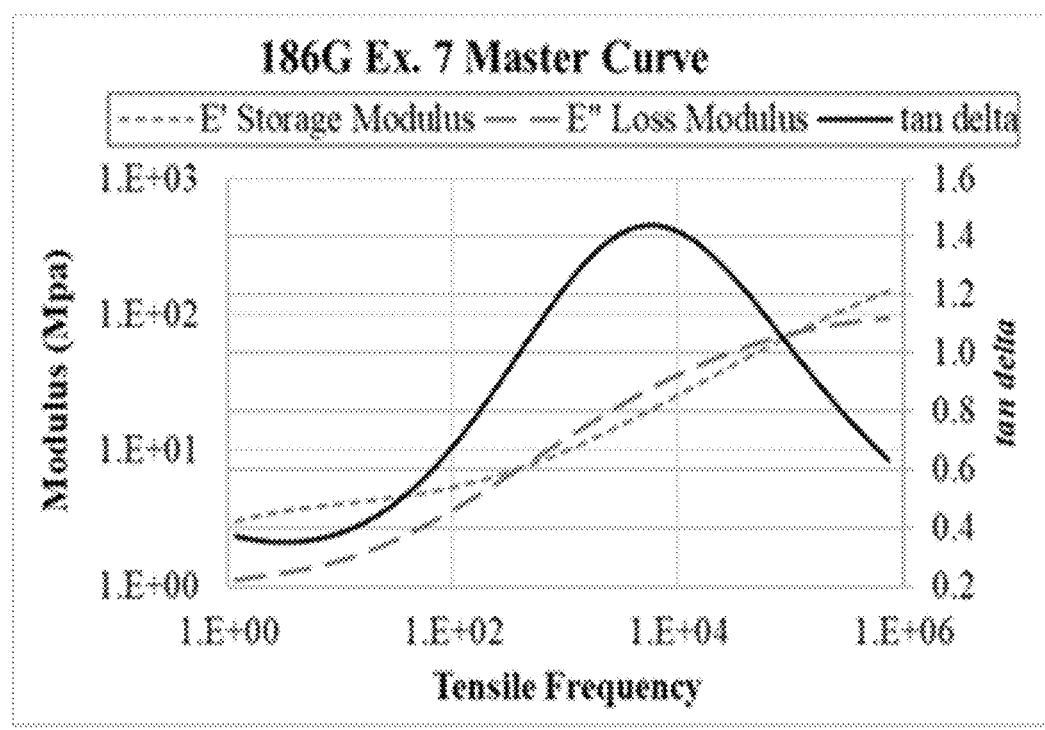
FIG. 8a shows the modulus master curve for the adhesive of Example 7.
Figure 8B:
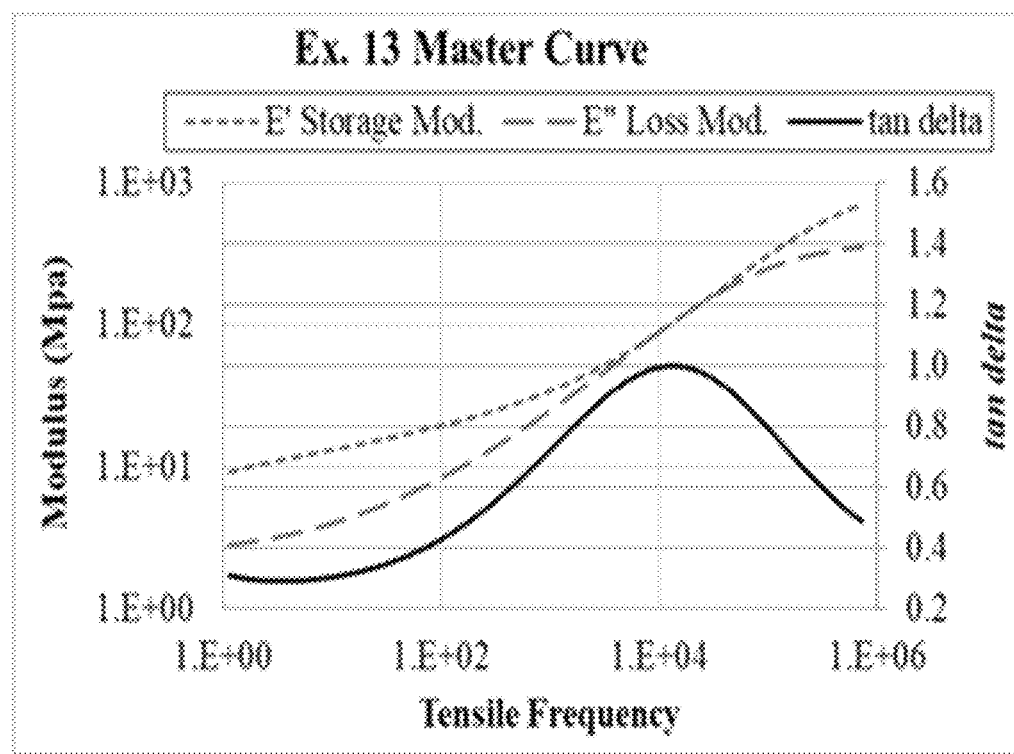
FIG. 8b shows the modulus master curve for the adhesive of Example 13.
Figure 8C:
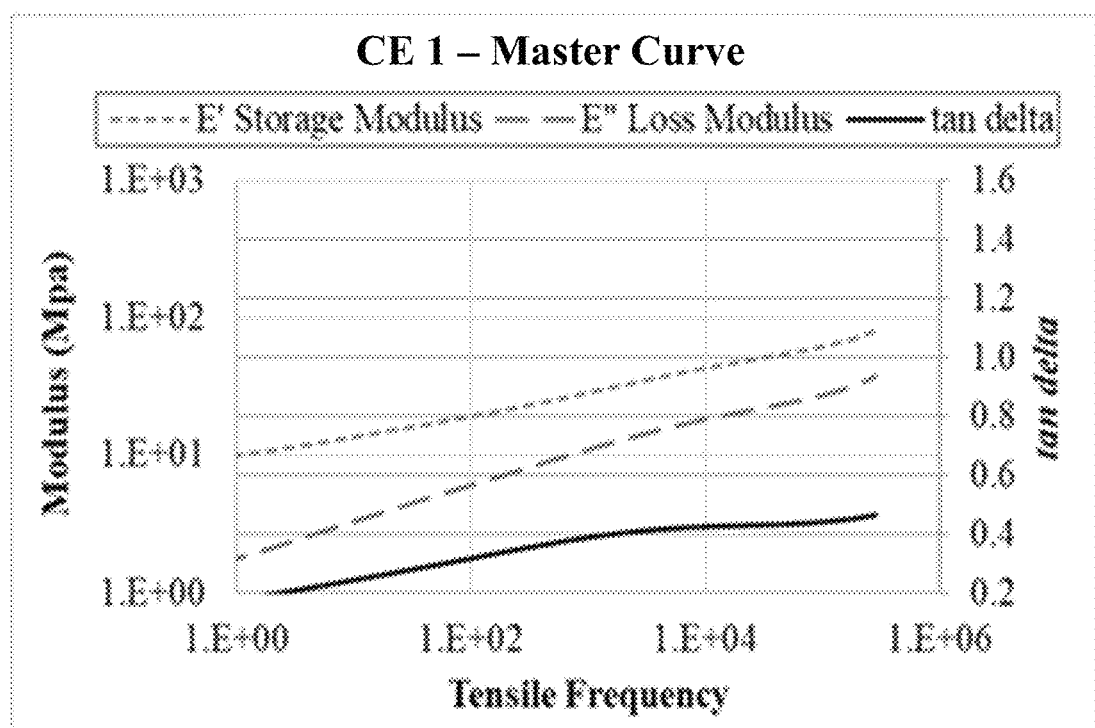
FIG. 8c shows the modulus master curve for the adhesive of Comparative Example CE1.
Figure 8D:
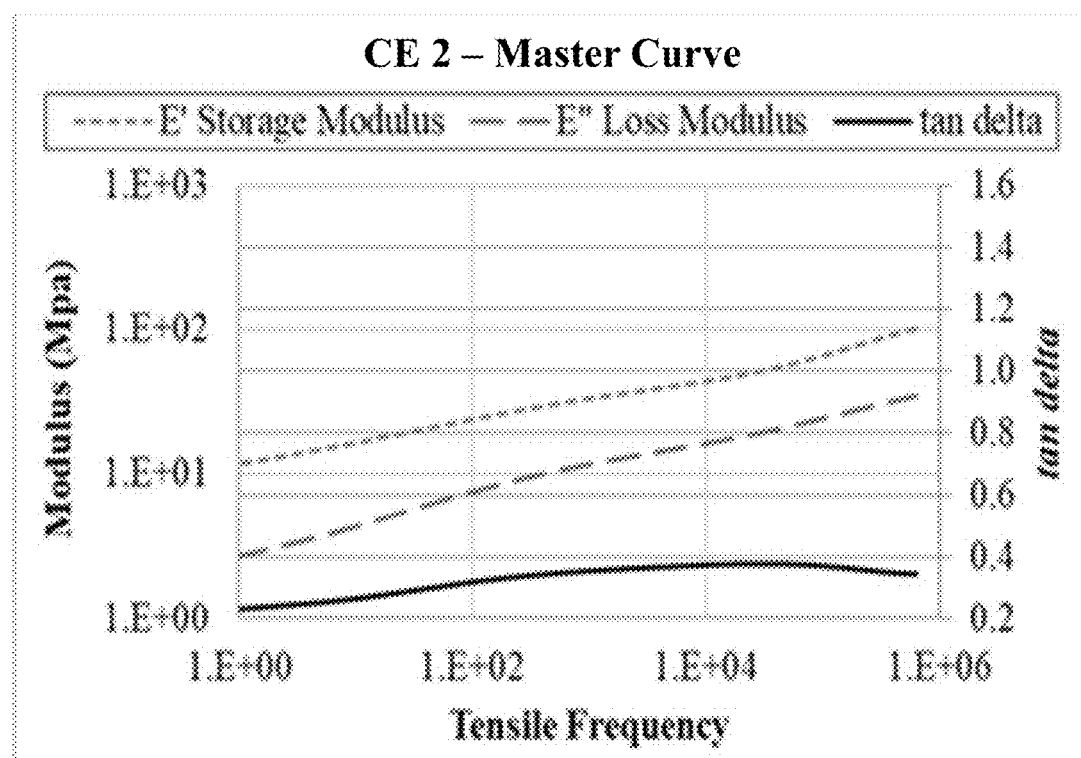
FIG. 8d shows the modulus master curve for the adhesive of Comparative Example CE2.

FIG. 7 shows the setup for measuring the creep or Cold Flow of a viscoelastic formulation. A 1 mm-thick disk of adhesive, 20 mm in diameter, was die cut and placed onto a release liner. Unlike other tests, there was no bonding or heating of the adhesive. The concentric rings provide an aid in the visual measurement of the disk's diameter. A second release liner was placed on top of the adhesive so that creep was unrestrained by surface energy. Multiple samples were prepared for each adhesive formulation. Weights were placed on some samples to amplify the cold flow response. The pressures applied ranged from 0 to 75 Pa, based on the starting disk diameters. The diameter of the adhesive disks was measured along orthogonal axes over the course of 30-days and a percent change in area was determined.

Modulus
Samples

Adhesive samples were prepared for a bending test by making rectangular chunks with dimensions of 20 mm Wide, by 40 mm Long, by 3 mm Thick. Comparative Example PSA tapes were cut to form 10 mm Wide by 40 mm Long strips. Since the PSA tapes are much thinner, multiple pieces were stacked on top of one another to form 2 mm thick samples. While the adhesive cannot be removed from these tapes, it should be noted that the stacks are reflective of the modulus of the entire system or adhesive/PET-structural layer/adhesive tape.

Testing

The HMA of the invention is designed for a specific function as described above. That function is improved by achieving a specific modulus profile, typically by altering the formulation. The method to identify the modulus profile is through identifying a material's 'master curve'. The master curve embodies how viscoelastic properties, such as rigidity, will respond to different types of forces via the frequencies it is modelled over. It indicates whether a material is more likely to maintain its cohesive strength or break under such forces.

A dual cantilevered bending test method is used to obtain master curves for the viscoelastic materials discussed herein. The ASTM D5418-15 method is known to those familiar with Dynamic Mechanical Analysis (DMA). The master curve test and all preliminary tests were done on a Metravib DMA+150. The 'modulus as a function of frequency' was determined using Time-Temperature Superposition modeling.

A test coupon is deflected at a set frequency and a set temperature while the resistive force is measured. The deflection is repeated at another frequency until all frequencies in the pre-selected range have been tested. This process is then repeated at different temperatures until all temperatures within a pre-selected range have been tested. This data can then be fit to a Time-Temperature Superposition model, which shows the Storage and Loss moduli as a function of frequency and temperature. The ratio of these two factors is referred to as tan δ, which is a predictor of the material's failure mode under different types of force.

Preliminary tests were run to identify the test parameter ranges relevant for each material. A Strain Sweep was used to determine the elastic range of strain to run. Secondly, a Frequency Sweep between 1 and 200 Hz was used to evaluate the stiffness and loss angle coming from a given sample's shape and identify the usable frequency range for the master curve calculation. Lastly, a Temperature Sweep was used to estimate the Tg of the material and improve accuracy of the master curve by selecting those temperatures at which frequency sweeps provide relevant information. Following the parameter selection, the final measurements were made on a fresh coupon.

TABLE 2

DMA Parameters Selected for Master Curve calculation

| Ex. | Strain (m) | Frequency (Hz) Lower | Frequency (Hz) Upper | Temperature (° C.) Steps Selected | Free span (mm) | Size (Wd × Ln × Thick) (all in mm) |
|---|---|---|---|---|---|---|
| 7 | 1E−04 | 1 | 50 | −5, 0, 5, 10, 15, 20 | 32.75 | 20 × 40 × 3 |
| 13 | 5E−04 | 1 | 50 | −5, 0, 5, 10, 15, 20 | 32.75 | 20 × 40 × 3 |
| C.E. 1 & 2 | 2E−04 | 1 | 11 | −10, −5, 0, 5, 5, 10, 15, 22.5 | 32.75 | 10 × 40 × 2 |
| 23 | 1E−04 | 1 | 50 | 0, 2, 4, 6, 8, 10, 20, 25 | 32.75 | 20 × 40 × 3 |
| 24 | 1E−04 | 1 | 50 | 0, 5, 10, 15, 20, 25 | 32.75 | 20 × 40 × 3 |
| 21 | 1E−04 | 1 | 50 | 0, 2, 4, 6, 8, 10, 20, 25 | 32.75 | 20 × 40 × 3 |

Experimental Results

In formulation Example 1, (formulations shown in TABLE 3A), PES-3 shows good impact tensile resistance as the primary polyester, where the gauge of impact resistance is the Mean Failure Energy (MFE), with units in mJ/cm$^2$ (data shown in TABLE 3B). Due to its low glass transition temperature (Tg) of −11° C., this adhesive cold-flows at room temperature, but prevents embrittlement of the adhesive under freezing conditions. In many embodiments, a more rigid adhesive is required for the intended application. Semi-crystalline PES-1 (Tg=−20° C.) resin was added along with the higher Tg PES-2 resin (Tg=69° C.) to reduce the cold flow. Examples 2, 3 and 4 show nearly equivalent impact resistance. Example 5 includes a wax that lowers the viscosity of the adhesive, which is an improvement for this application, and increases impact resistance.

After additional studies of the wax concentration, Example 7 in (formulation in TABLE 3A, and test data in TABLE 3B) shows a >90% improvement to the MFE from Example 5 below.

As viscosities≤30,000 cP at 180° C. are desirable for nozzle dispensing of the adhesive, means of lowering this parameter of the formulation were investigated. Mineral oil is commonly used in hot melt adhesives for this purpose with a typical formulation loading of 10% or more. In general, Examples 8, 9 and 10 show this plasticizing additive lowers the impact strength of the adhesive. Nonetheless, mineral oil remains to be useful for applications where lower viscosity is more critical than high impact strength.

To further reduce cold-flow and to fine tune the modulus properties of the adhesive, a crosslinking material was included in Examples 12 through 22, preferably a trimer isocyanate crosslinker, to link with hydroxyl-terminated polyester molecules.

Preferably, the flow (spread) is minimal, especially under pressure. Thus, a lower percent change is preferred. In some embodiments, the flow change is ≤30%, or ≤20% or ≤15% or ≤10% or ≤7%. For some applications, spread minimization is not a required property. Thus, Example 13 would be a more suitable choice for applications than Example 1 where spread minimization is desired, see TABLE 3A, but Example 1 could be used where spread is less critical or not a required property.

TABLE 3A

Inventive Examples 1 to 24 Formulations

| Ex. | PES-1 wt % | PES-2 wt % | PES-3 wt % | PP wt % | Pig wt % | Wax-1 wt % | Wax-2 wt % | Wax-3 wt % | MO wt % | XL-1 wt % | XL-2 wt % | XL-3 wt % | XL-4 wt % | Total wt % |
|---|---|---|---|---|---|---|---|---|---|---|---|---|---|---|
| 1 | | | 97.0 | | 3.0 | | | | | | | | | 100.0 |
| 2 | 10.0 | 2.0 | 85.0 | | 3.0 | | | | | | | | | 100.0 |
| 3 | 20.0 | 2.0 | 75.0 | | 3.0 | | | | | | | | | 100.0 |
| 4 | 29.5 | 3.9 | 63.7 | | 2.9 | | | | | | | | | 100.0 |
| 5 | 20.0 | 2.0 | 73.0 | | 3.0 | 2 | | | | | | | | 100.0 |
| 6 | 20.0 | 2.0 | 71.5 | | 3.0 | 3.5 | | | | | | | | 100.0 |
| 7 | 20.0 | 2.0 | 70.0 | | 3.0 | 5 | | | | | | | | 100.0 |
| 8 | 20.0 | 2.0 | 67.5 | | 3.0 | 7.5 | | | | | | | | 100.0 |
| 9 | 15.0 | 2.0 | 70.0 | | 3.0 | 4 | | | 6.0 | | | | | 100.0 |
| 10 | 20.0 | 2.0 | 69.0 | | 3.0 | 5 | | | 1.0 | | | | | 100.0 |
| 11 | 20.0 | 2.0 | 69.0 | | 3.0 | 4 | | | 2.0 | | | | | 100.0 |
| 12 | 18.9 | 1.9 | 66.3 | | 3.0 | 4.6 | | | | | 5.3 | | | 100.0 |
| 13 | 19.0 | 1.9 | 68.5 | | 3.0 | 4.6 | | | | | 3 | | | 100.0 |
| 14 | 19.5 | 1.9 | 70.0 | | 3.0 | 4.6 | | | | | 1 | | | 100.0 |
| 15 | 19.0 | 1.9 | 68.5 | | 3.0 | | 4.6 | | | | 3 | | | 100.0 |
| 16 | 19.0 | 1.9 | 68.5 | | 3.0 | | | 4.6 | | | 3 | | | 100.0 |
| 17 | 19.0 | 1.9 | 68.5 | 4.6 | 3.0 | | | | | | 3 | | | 100.0 |
| 18 | 19.0 | 1.9 | 67.1 | 3 | 3.0 | 3.0 | | | | | 3 | | | 100.0 |
| 19 | 19.0 | 1.9 | 68.5 | 1.6 | 3.0 | 3.0 | | | | | 3 | | | 100.0 |
| 20 | 19.0 | 1.9 | 68.5 | | 3.0 | 4.6 | | | | | | 3 | | 100.0 |
| 21 | 19.5 | 2.0 | 70.4 | | 3.1 | 4.7 | | | | | | | 0.29 | 100.0 |
| 22 | 19.0 | 1.9 | 66.5 | | 3.0 | 4.6 | | | | | | | 5 | 100.0 |
| 23 | 19.5 | 2.0 | 70.7 | | 3.1 | 4.7 | | | | | | | | 100.0 |
| 24 | 19.5 | 2.0 | 70.6 | | 3.1 | 4.7 | | | | | | 0.14 | | 100.0 |

TABLE 3B

Impact strength (MFE) of Examples 1 to 24

| Ex. | MFE mJ/cm² | Bond Pressure kPa | Bond time seconds |
|---|---|---|---|
| 1 | 159 | 50 | 60 |
| 2 | 129 | | |
| 3 | 159 | | |
| 4 | 206 | | |
| 5 | 224 | 50 | 60 |
| 6 | 353 | | |
| 7 | 429 | | |
| 8 | 212 | | |
| 9 | 265 | 0 | 90 |
| 10 | 353 | | |
| 11 | 382 | | |
| 12 | 353 | 11.5 | 90 |
| 13 | 441 | | |
| 14 | 535 | | |
| 15 | 300 | 14.4 | 90 |
| 16 | 224 | | |
| 17 | 512 | 14.4 | 90 |
| 18 | 547 | | |
| 19 | 482 | | |
| 20 | 535 | 11.5 | 90 |
| 21 | 512 | 14.4 | |
| 22 | 365 | 2.9 | |
| 23 | 653 | 14.4 | 90 |
| 24 | 665 | | |

[1]A higher MFE value is advantageous. In certain embodiments, the MFE would be ≥300 or ≥600 mJ/cm².

Using the set-up of FIG. 7, the difference in cold flow was quickly observable after one day between Example 1 and Example 13. With no weight applied, Example 1 deforms within days, while Example 13 requires more than 17.5 Pa of pressure to deform by 5% after 30 days. Data are shown in TABLE 4.

TABLE 4

Cold Flow Dependence on Formulation

| | | Example 1 | | Example 13 | |
|---|---|---|---|---|---|
| Day 0 Pressure Pa | Day 0 Diameter mm | Day 13 Diameter mm | Change in Area % | Day 30 Diameter mm | Change in Area % |
| 0.0 | 20 | 22 | 21% | 20 | 0% |
| 17.5 | 20 | 27.5 | 89% | 20 | 0% |
| 32.8 | 20 | 29 | 110% | 20.5 | 5% |
| 42.3 | 20 | 31 | 140% | 20.5 | 5% |
| 74.8 | 20 | 33.5 | 181% | 20.5 | 5% |
| 0.0 | 20 | 21 | 10% | 20 | 0% |

TABLE 5 shows results from Chemical Resistance tests. The Frame and Window substrates used for this example were all SUS parts. In some cases, only the harshest chemicals, namely Bug Spray and Perfume, were used to filter out formulations expected to perform poorly. For instance, Examples 2 and 3 have very simple formulas that were not expected to perform well in those chemicals. Only in Example 4 does a solely polymeric formulation show suitable resistance to Oleic acid, Bug-spray, and Perfume. Examples 5 through 21, where wax and crosslinkers were employed, show good resistance to the other chemicals. Example 13 maintains strong resistance properties after exposure to Sebum.

TABLE 5

Chemical Resistance data

| Example | [1]Control mJ/cm² | Oleic acid mJ/cm² | Windex mJ/cm² | Bug Spray mJ/cm² | Perfume mJ/cm² | Sebum mJ/cm² |
|---|---|---|---|---|---|---|
| 2 | 224 | | | 41 | 12 | |
| 3 | 224 | | | 53 | 12 | |
| 4 | 276 | 171 | 182 | 76 | 41 | 194 |
| 5 | 353 | 182 | 129 | 118 | 65 | 171 |
| 7 | 300 | 171 | 224 | 94 | 41 | 224 |
| 13 | 447 | 159 | 194 | 76 | 41 | 235 |

The data in TABLE 5 refers to impact energy values.

[1]Control refers to no exposure to materials after 72 hours at 65° C. and RH 50%

All of the results for oleic acid, Windex, bug spray, perfume and sebum were obtained after 72 hours at 65° C. and RH 50%

Based on the Impact and Chemical Resistance performance of Example 13, it was subjected to the DI Water Immersion Resistance test. TABLE 6 shows the MFE after the 20-day submersion, at 40° C. and 50% RH, to the solutes. It is preferred that ≥40% of the impact strength is maintained after immersion. The table shows that impact strength of Example 13 is retained at about 47-50% for the chlorine and soap samples, while the adhesive performs even better in the DI water and salt solutions.

TABLE 6

Impact Strength of Example 13 after Immersion test

| Solutes | [2]MFE (mJ/cm²) |
|---|---|
| [1]Control | 306 |
| DI Water | 216 |
| Chlorine 6 ppm | 144 |
| Salt 4% | 269 |
| Soap 0.1% | 154 |

[1]Control refers to Example 13 with no immersion
[2]Refers to 20-day submersion, at 40° C. and 50% RH Two commercially available PSA tapes, each 200 µm thick, are used for Comparative Examples, CE 1 and 2 below. The tapes are designed for bonding and sealing electrical devices that require impact absorption. CE 2 is constructed of a polyethylene foam between two acrylic adhesive layers. CE 1 uses a softer foam core material with a different modulus profile. The average 180° Peel Strength for these examples and Example 13 are reported in TABLE 6. Standard deviations are noted in parenthesis to provide a gauge of statistical significance. Example 13 provides roughly twice the peel strength of the CE's.

After Example 13 was peel tested, the SUS foils were re-bonded to the substrates as indicated by the Bond Method "Sun Re-Bond" and retested. There was statistically no difference between the original and re-bonded peel strengths. This re-bondability demonstrates how the adhesive does not degrade after de-bonding and re-bonding as may be needed for some handheld electronic device repairs. In parallel, 180° Peel Strength bonded coupons were aged at 23° C. and 50% RH. Multiple coupons were made so that some could be tested each week. After six weeks there was no change. Steady performance of the adhesive is critical for devices so that the de-bonding force does not either increase or decrease over time.

TABLE 7

180° Peel Strength of Comparative
Examples, Example 13 re-bonded and aged

| Example | Bond Method | Peel Strength (N/mm) |
|---|---|---|
| CE 1 | PBM | 1.44 (0.26) |
| CE 1 | HBM | 1.45 (0.17) |
| CE 2 | PBM | 1.22 (0.08) |
| CE 2 | HBM | 1.27 (0.06) |
| 13 | HBM | 3.2 (0.4) |
| 13 | Sun Re-Bond | 3.6 (0.5) |
| 13-Wk. 2 | HBM | 3.7 (0.4) |
| 13-Wk. 4 | HBM | 3.8 (0.4) |
| 13-Wk. 6 | HBM | 3.8 (0.4) |

The two PSA comparative examples above were subjected to the Chemical Resistance test for oleic acid, bug-spray, and perfume. After the 3-day soak in the three chemicals, the test coupons could not be lifted out of any of the dishes containing chemicals without breaking the coupons. Therefore, TABLE 8 below reports their impact strength to be zero for these three chemicals.

The Chemical Resistance data for Examples 7 and 21 from TABLE 5 were included in TABLE 8 for ease of comparison between coupons that have not been primed versus those that have been primed. Examples 13 and 21 are considered comparable. This assumption is based on the facts that Example 21 has a more active crosslinker at a lower concentration than Example 13, and that the remainder of the Example 21 formulation has been increased proportionately for the 2.7% difference in the crosslinker with Example 13. As previously mentioned, the inclusion of the primer allows for chemical bonding and not just Van de Waals bonds. This is one possible reason behind the overall increase in chemical resistance of Example 21 with primer over the unprimed Example 13 coupons. Similarly, between the unprimed Example 13 and primed Example 21 the chemical resistance of the HMA gaskets of the present invention was improved with the primer for all chemicals tested as described above other than Perfume.

TABLE 8

Chemical Resistance of PSAs, Unprimed, and Primed Examples

| Ex. | Bond Pressure kPa | Bond Time seconds | Control t = 3 d mJ/cm$^2$ | Control mJ/cm$^2$ | Oleic acid mJ/cm$^2$ | Windex mJ/cm$^2$ | Bug Spray mJ/cm$^2$ | Perfume mJ/cm$^2$ | Sebum mJ/cm$^2$ |
|---|---|---|---|---|---|---|---|---|---|
| C. E. 1 | 14.4 | 90 | 94 | 94 | 0 | | 0 | 0 | |
| C. E. 2 | 14.4 | 90 | 94 | 94 | 0 | | 0 | 0 | |
| 7 w/o Primer | 14.4 | 90 | 429 | 300 | 171 | 224 | 94 | 41 | 224 |
| 7 w/ Primer | 14.4 | 90 | 512 | 535 | 459 | 247 | 182 | 65 | 459 |
| 13 w/o Primer | 14.4 | 90 | 265 | 447 | 159 | 194 | 76 | 41 | 235 |
| 21 w/ Primer | 14.4 | 90 | 524 | 618 | 512 | 329 | 118 | 41 | 482 |
| 23 w/ Primer | 14.4 | 90 | 653 | 694 | 429 | | 300 | 182 | |
| 24 w/ Primer | 14.4 | 90 | 694 | 735 | 447 | | 329 | 171 | |

A primer is frequently used in conjunction with a PSA tape to improve the chemical resistance, which may provide more effective chemical resistance. However, as TABLE 4 above shows, HMA compositions provide excellent chemical resistance without primer.

In consideration of the use of primers for sealing devices with PSA tapes, a primer comprising an amino silane and an alcohol was developed for the HMA formulations discussed herein. The PSA tapes were not compatible with this primer. The primer was applied to the Frame and Window substrates in a liquid state. These parts were placed in a 65° C. box oven for five minutes to dry off the solvent present in the primer. Standard means of bonding the Chemical Resistance parts was then followed. TABLE 8 shows Chemical Resistance data obtained for Examples 7 and 21 with the primer. As in TABLE 5, the bond time was 90 seconds. Unlike the control in TABLE 5, the "Control t=3d" was stored at 23° C. and 50% RH for 3-days, 72 hours, prior to being impact tested rather than 17-hours. The "Control" is the control sample of TABLE 5.

[1]Primer is DPE-1723 (Sun Chemical)
Modulus

The The low-frequency modulus data relates to general forces handheld and wearable electronic devices might encounter such as being sat or stepped on. The high-frequency modulus data relates to forces applied over short time durations.

The results in TABLE 9C exhibit a frequency sweep.

TABLE 9A

1 Hz Oscillation Frequency Moduli

| Example | E' (MPa) | E" (MPa) | tan δ | Phase Angle (°) |
|---|---|---|---|---|
| Comparative 1 | 10.0 | 1.8 | 0.18 | 10.0 |
| Comparative 2 | 11.9 | 2.7 | 0.23 | 12.9 |
| 7 | 2.9 | 1.1 | 0.38 | 20.7 |
| 13 | 8.8 | 2.8 | 0.32 | 17.6 |
| 23 | 2.3 | 0.9 | 0.37 | 20.3 |
| 24 | 3.8 | 1.3 | 0.35 | 19.3 |
| 21 | 2.2 | 0.9 | 0.40 | 21.8 |

TABLE 9B 10,000 Hz Oscillation Frequency Moduli

| Example | E' (MPa) | E" (MPa) | tan δ | Phase Angle (°) |
|---|---|---|---|---|
| Comparative 1 | 43.1 | 18.2 | 0.42 | 22.9 |
| Comparative 2 | 44.0 | 16.3 | 0.37 | 20.4 |
| 7 | 25.7 | 36.4 | 1.42 | 54.8 |
| 13 | 89.5 | 89.1 | 0.99 | 44.8 |
| 23 | 27.9 | 43.2 | 1.55 | 57.2 |
| 24 | 30.0 | 43.6 | 1.45 | 55.4 |
| 21 | 33.6 | 53.9 | 1.60 | 58.0 |

TABLE 9C

Room-temperature Modulus Properties of Examples 7, 13, CE1, and CE2

| Freq (Hz) | Example 7 | | | Example 13 | | |
|---|---|---|---|---|---|---|
| | E' (MPa) | E" (MPa) | tan δ | E' (MPa) | E" (MPa) | tan δ |
| 1 | 2.9 | 1.1 | 0.38 | 8.8 | 2.8 | 0.32 |
| 10 | 4.0 | 1.6 | 0.39 | 13.1 | 4.0 | 0.31 |
| 100 | 5.4 | 3.7 | 0.68 | 19.4 | 8.3 | 0.43 |
| 1,000 | 10.0 | 12.3 | 1.23 | 34.3 | 24.7 | 0.72 |
| 10,000 | 25.7 | 36.4 | 1.42 | 89.5 | 89.1 | 0.99 |
| 100,000 | 71.5 | 72.6 | 1.02 | 312.7 | 248.0 | 0.79 |
| 1,000,000 | 165.0 | 96.7 | 0.59 | 781.0 | 359.4 | 0.46 |

| Freq (Hz) | Comparative Example 1 | | | Comparative Example 2 | | |
|---|---|---|---|---|---|---|
| | E' (MPa) | E" (MPa) | tan δ | E' (MPa) | E" (MPa) | tan δ |
| 1 | 10.0 | 1.8 | 0.18 | 11.9 | 2.7 | 0.23 |
| 10 | 13.5 | 3.3 | 0.24 | 16.6 | 4.4 | 0.26 |
| 100 | 19.1 | 6.0 | 0.32 | 24.0 | 7.6 | 0.32 |
| 1,000 | 28.4 | 10.9 | 0.39 | 33.4 | 11.7 | 0.35 |
| 10,000 | 43.1 | 18.2 | 0.42 | 44.0 | 16.3 | 0.37 |
| 100,000 | 62.1 | 27.2 | 0.44 | 65.8 | 24.2 | 0.37 |
| 1,000,000 | 179.2 | 91.5 | 0.51 | 106.9 | 37.1 | 0.35 |

The static modulus, at an oscillation frequency of 1 Hz, data for Examples, 7, 13, 23, 24, and 21 have a tan δ well below 1 and a phase angle well below 45°. The primary resistance to deformation comes from E'. Whereas the modulus at 10 Kilohertz, for those same samples, shifts significantly towards having the E" playing an equal or greater resistance to deformation. The formulations for Examples 7 and 23 have no crosslinking material (0% for the purposes of this discussion). Example 21 has the most crosslinking material (100% for the purposes of this discussion), and Example 24 has about half the amount of crosslinker present compared to Example 21 (50% for the purposes of this discussion). E" trends upward with the amount of crosslinker in the formulation. Experimentally, we see in Table 3B, that moving from 0% to 50% to 100% of the crosslinker in formulations 23, 24, and 21 respectively, the impact resistance goes from 653 to 665, and down to 512 mJ/cm2. However, Table 8 shows the chemical resistance to bug spray and perfume improve.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A hot melt adhesive composition comprising:
   60 to 97% by weight of an amorphous polyester resin and polypropylene resin with a Tg≤0° C., based on the total weight of the composition;
   wherein the loss modulus of the adhesive at 20° C. and at an oscillation frequency of 10 kiloHertz is greater than 25 MPa.

2. A hot melt adhesive composition comprising:
   60 to 90% by weight of an amorphous polyester resin and/or polypropylene resin with a Tg≤0° C.;
   5 to 35% by weight of a crystalline or semi-crystalline polyester resin with a Tg of −50° C. to 0° C.;
   1 to 5% by weight of an amorphous polyester resin with a Tg≥50° C.;
   0 to 5% by weight of a colorant;
   0 to 10% by weight of a wax; and/or
   0 to 7.5% by weight of a crosslinker;
   wherein all weights are a percent by weight based on the total weight of the composition;
   wherein the resins and the compositions reflow and bond at about 40° to about 80° C.; and
   wherein the weight average molecular weights of the polyesters is from about 7,000 to about 120,000 Da;
   wherein the loss modulus of the adhesive at 20° C. and at an oscillation frequency of 10 kiloHertz is greater than 25 MPa.

3. A hot melt adhesive composition comprising:
   60 to 90% by weight of an amorphous polyester resin with a Tg≤0° C.;
   5 to 35% by weight of a crystalline or semi-crystalline polyester resin with a Tg of −50° C. to 0° C.;
   1 to 5% by weight of an amorphous polyester resin with a Tg≥50° C.;
   0 to 5% by weight of a colorant;
   0 to 10% by weight of a wax;
   0 to 7.5% by weight of a crosslinker; and/or
   0 to 6% by weight polypropylene,
   wherein all weights are a percent by weight based on the total weight of the composition;
   wherein the polyester resins and the compositions reflow and bond at about 40° to about 80° C.; and
   wherein the weight average molecular weights of the polyesters is from about 7,000 to about 120,000 Da;
   wherein the loss modulus of the adhesive at 20° C. and at an oscillation frequency of 10 kiloHertz is greater than 25 MPa.

4. The hot melt adhesive composition of claim 3, comprising one or more of:
   1 to 5% by weight of a colorant;
   1 to 8% by weight of a wax;
   0.1 to 7% by weight of a crosslinker; and/or
   1 to 6% by weight polypropylene.

5. The hot melt adhesive composition of claim 4, comprising:
   1 to 5% by weight of a colorant; and
   1 to 8% by weight of a wax.

6. The hot melt adhesive composition of claim 4, comprising
   0.1 to 7% by weight of a crosslinker.

7. The hot melt adhesive composition of claim 4, comprising
   1 to 6% by weight polypropylene.

8. The hot melt adhesive composition of claim 1 wherein the polyesters are hydroxyl terminated, with a hydroxyl number between 1 to 4 mg KOH/g.

9. The hot melt adhesive composition of claim 2, wherein the wax is selected from the group consisting of Fischer-Tropsch waxes, Montanwax, amide, polyethylene, polypropylene or vinyl acetate, and wherein melting point of the wax is ≤150° C.

10. The hot melt adhesive composition of claim 1, wherein at least one of the polyesters is selected from the group consisting of poly(butylene isophthalate); poly(butylene adipate); poly(butylene sebacate); poly(butylene succinate); poly(butylene terephthalate); poly(ethylene adipate); poly(ethylene sebacate); poly(ethylene succinate); poly(ethylene phthalate); poly(ethylene naphthalate); poly(ethylene terephthalate); poly(cyclohexylenedimethylene terephthalate); poly(ethylene isophthalate); poly(caprolactone); poly(hexylene sebacate); poly(hexylene succinate); polyglycolide; or a combination thereof.

11. The hot melt adhesive composition of claim 1, wherein the weight average molecular weights of the polyesters are 9,000 to 120,000 Da.

12. The hot melt adhesive composition of claim 1, comprising a polypropylene resin selected from the group consisting of atactic polypropylene, syndiotactic polypropylene, isotactic polypropylene, or blends thereof.

13. The hot melt adhesive composition of claim 10 wherein the polypropylene resin has a melt temperature of <150° C.

14. The hot melt adhesive composition of claim 1, further comprising a hydroxyl-phenoxy resin with a Tg<100° C.

15. The hot melt adhesive composition of claim 1, further comprising mineral oil.

16. A process for providing a seal on an electronic device, comprising applying the hot melt adhesive composition of claim 1 on an electronic device and curing at 40° to 80° C.

17. An electronic device comprising the hot melt adhesive composition of claim 1.

* * * * *